(12) United States Patent　(10) Patent No.: US 6,792,277 B2
Rajaniemi et al.　(45) Date of Patent: Sep. 14, 2004

(54) ARRANGING CONTROL SIGNALLINGS IN TELECOMMUNICATIONS SYSTEM

(75) Inventors: Jaakko Rajaniemi, Helsinki (FI); Heikki Einola, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/026,948

(22) Filed: Dec. 27, 2001

(65) Prior Publication Data

US 2002/0086670 A1 Jul. 4, 2002

Related U.S. Application Data

(63) Continuation of application No. PCT/FI00/00595, filed on Jun. 29, 2000.

(30) Foreign Application Priority Data

Jul. 2, 1999　(FI) ................................................ 991521

(51) Int. Cl.⁷ ............................................... H04Q 7/20
(52) U.S. Cl. ............................. 455/456.1; 455/432.1; 455/432.2; 455/433; 455/414.2; 455/435.1; 455/458; 455/456.2; 455/461; 455/435
(58) Field of Search ............................... 455/426, 432, 455/433, 435, 436, 456, 458, 461, 439, 432.15, 435.1, 447, 456.1, 456.2

(56) References Cited

U.S. PATENT DOCUMENTS

| | | | | |
|---|---|---|---|---|
| 5,711,001 A | * | 1/1998 | Bussan et al. | 455/432.1 |
| 5,815,816 A | * | 9/1998 | Isumi | 455/445 |
| 5,835,061 A | * | 11/1998 | Stewart | 342/457 |
| 6,032,042 A | * | 2/2000 | Kauppi | 455/432 |
| 6,212,380 B1 | * | 4/2001 | Laatu | 455/436 |
| 6,212,390 B1 | * | 4/2001 | Rune | 455/410 |
| 6,212,391 B1 | * | 4/2001 | Saleh et al. | 455/456.4 |
| 6,285,667 B1 | * | 9/2001 | Willars et al. | 370/329 |
| 6,292,667 B1 | * | 9/2001 | Wallentin et al. | 455/435 |
| 6,295,455 B1 | * | 9/2001 | Fischer et al. | 455/456.2 |
| 6,301,479 B1 | * | 10/2001 | Roobol et al. | 455/410 |
| 6,356,763 B1 | * | 3/2002 | Kangas et al. | 455/456.1 |
| 6,363,252 B1 | * | 3/2002 | Hamalainen et al. | 455/436 |
| 6,397,065 B1 | * | 5/2002 | Huusko et al. | 455/426 |

FOREIGN PATENT DOCUMENTS

| | | |
|---|---|---|
| WO | WO 97/26739 | 7/1997 |
| WO | WO 98/37721 | 8/1998 |
| WO | WO 98/37721 A3 | 8/1998 |
| WO | WO 98/37721 A2 | 8/1998 |

OTHER PUBLICATIONS

Berruto et al., "Research Activities on UMTS Radio Interface, Network Architectures and Planning," IEEE Communications Magazine, vol. Feb. 1998, pp. 89–91, FIgures 6–9.

* cited by examiner

Primary Examiner—Marceau Milord
(74) Attorney, Agent, or Firm—Pillsbury Winthrop LLP (57) ABSTRACT

Implementing control signallings in a telecommunication system comprising at least one terminal and one telecommunication network, the telecommunication network comprising at least one access network and one or more core networks. Within a certain time, the terminal determines the detected control signalling needs and transmits a request for maintaining a radio connection to the telecommunication network if several control signallings are to be carried out. The control signallings are carried out successively between the terminal and one or more core networks without releasing the radio connection between the terminal and the access network.

27 Claims, 3 Drawing Sheets

ARRANGING CONTROL SIGNALLINGS IN TELECOMMUNICATIONS SYSTEM

This is A Continuation application of PCT/FI00/00595, which was filed on Jun. 29, 2000 in the English language.

The present invention relates to a method, a telecommunication system, a network element of the telecommunication system and a terminal for arranging control signallings according to the preambles of the independent claims.

In telecommunication systems, in addition to the actual user data to be transmitted, such as speech information, for example, a large amount of different control information is transmitted between different parts of a network. In the telecommunication systems, a great amount of different control signalling is carried out between a terminal and a telecommunication network for identifying a user or for transmitting service requests, for example.

A purpose of mobile communication systems is to provide mobile users with wireless data transmission services. Hence, it is essential, particularly in the mobile communication systems, that a mobile communication network is aware of the location of a mobile station registered therein. Various mobility management protocols have been developed for this purpose.

In order to reduce unnecessary signalling, the mobile communication systems have typically been arranged such that in mobile terminated connections, a subscriber is paged within the area of only a few base stations. Each base station has a certain coverage area, which forms a cell. Cells form location areas, and a mobile station is paged only in the cells in the location area. Consequently, in order to obtain services from a serving base station, the mobile station must inform the mobile communication system of the location area within which the subscriber can be paged. The mobile station can carry out location update for the purpose. Location update can thus be used to update the subscriber location information in the network and possibly also to carry out other procedures. For example, a network according to a GSM system can transmit information about available services to the mobile station in connection with location update.

So-called third generation mobile communication systems have been developed worldwide. A $3^{rd}$ generation partnership project 3GPP standardizes a third generation mobile communication system called a universal mobile telecommunications system UMTS based on the GSM system, which, for example, includes a new radio interface. The UMTS radio interface will be based on at least a wideband code division multiple access WCDMA technology.

Figure 1:
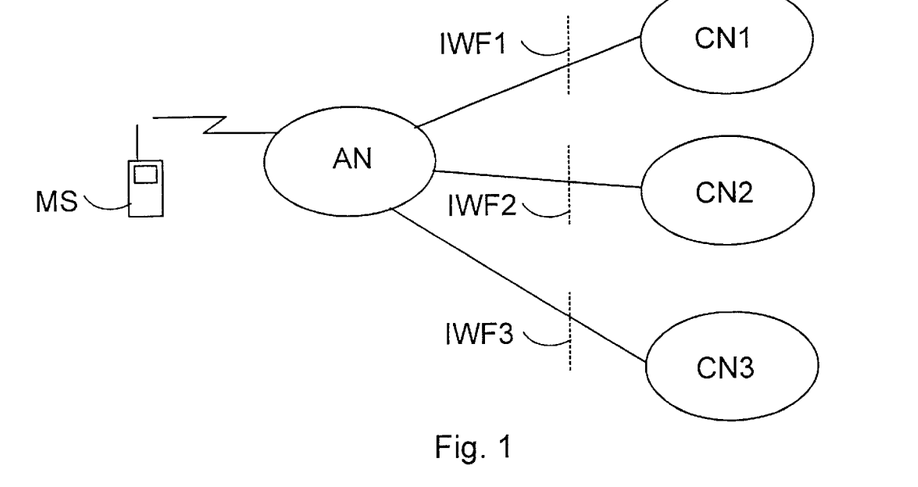

FIG. 1 generally illustrates a mobile communication system, such as the UMTS system, according to the third generation principles. The development of the UMTS aims for flexibility, whereby a so-called access network AN can be connected to many different core networks CN1, CN2 and CN3. Since the core networks can vary greatly in their operation, interworking functions IWF1, IWF2 and IWF3 may be necessary between the access network AN and each core network. In connection with the present application, an access network refers to a network which provides the mobile station MS with a radio connection, in other words typically to a base station system.

As far as the core networks are concerned, the UMTS will probably, at least in part, be based on the GSM system, in which case connection management and mobility management in the UMTS will be mostly similar to those in the GSM system. The UMTS will enable circuit-switched and packet switched services. The packet-switched services can be based on a general packet radio service GPRS service in the GSM. The circuit-switched and packet-switched connections are controlled by different network elements that can thus form, at least in part, operationally separate core networks (or domains, as they can also be called). Location areas and mobility management can then also differ even though the mobile station communicates via the same access network.

Since in the UMTS system the core networks may be separate from each other, separate and possibly different control signalling functions may be necessary between each core network and mobile station for location update, for example. In connection with the present application, networks elements responsible for the circuit- and packet-switched connections in the UMTS system are treated as separate core networks. Different core networks can still operate controlled by a common network management and use common network elements, such as a home location register HLR, which comprises subscriber information.

Mobile stations are being developed for the UMTS system that can support several different core networks. In the UMTS system, one mobile station can have several simultaneous connections to different core networks, such as a circuit- and packet-switched connection, for example. The mobile station can be registered in more than one core network. Hence, it may be necessary in the UMTS system to carry out separate control signalling functions between the mobile station and a plurality of core networks for location update, for example.

In the UMTS system, the mobile station may monitor location area identifiers of several different core networks broadcast by the UMTS access network. The mobile station may then, when more than one location area changes, have a need to carry out several location updates over a short period of time. For this purpose, the mobile station reserves a radio connection for signalling from the access network and transmits a location updating message to a core network. When the location update is completed, the radio connection between the mobile station and the access network is released.

If the mobile station is to carry out location update to another core network, the radio connection must be re-established. Although the access network is common to different core networks, the radio connection must be released and re-established between different location updates. A similar procedure must also take place in substantially successive control signallings of other kinds even if the control signalling to a second core network were carried out soon after the control signalling to a first core network. This causes signalling load over the radio interface and is thus against general design objectives that try to minimize signalling over the radio interface.

An object of the invention is thus to provide a method and an apparatus implementing the method so as to alleviate the above-mentioned drawback. The objects of the invention are achieved by a method, a telecommunication system, a network element of the telecommunication system and a terminal characterized in what is disclosed in the independent claims. Preferred embodiments of the invention are disclosed in the dependent claims.

The idea underlying the invention is that the connection between the access network and the terminal is not released between substantially successive control signallings between at least one core network and the terminal. The access network maintains the connection after the control signalling between the core network and the terminal for another potential need. According to a preferred embodiment of the invention, the need to maintain the connection between the access network and the terminal can be detected by means of a predetermined time limit in the terminal. A solution of the invention has the advantage that several substantially successive control signallings can be carried out without releasing and re-establishing the connection between the access network and the terminal between the signallings, which means that signalling over the radio interface at issue is reduced. The invention can particularly well be applied to different mobile communication systems providing a radio connection, in which case the terminal is a mobile station. Hence, the amount of signalling to be carried out over the radio interface can be reduced.

According to a preferred embodiment of the invention, the terminal determines the core networks to which control signallings are to be carried out by utilizing the time limit and transmits a request for maintaining the connection between the access network and the terminal to the telecommunication network. On the basis of the request, the connection will be maintained until the control signallings to all core networks have been carried out. According to preferred embodiments of the invention, the terminal can transmit to the telecommunication network information about the number of control signallings and/or core networks to which control signallings are to be carried out. The advantage achieved is that when the control signallings are directed to a plurality of core networks, the connection can be maintained in the telecommunication network on the basis of the information transmitted by the terminal only for the necessary period of time.

According to a preferred embodiment of the invention, in the telecommunication system a timer can be set to control as to how long the connection between the access network and the terminal is maintained. The connection can then be maintained only for a restricted period of time particularly in case of error situations.

Control signallings can be, for example, location updates to several different core networks. The request for maintaining the connection between the access network and the terminal can be transmitted either to the access network or the core network.

The invention is now described in closer detail in connection with the preferred embodiments and with reference to the accompanying drawings, in which FIG. 1 generally shows a UMTS system.

In the following, the primary embodiments of the invention will be described in a mobile communication system according to the UMTS principles without any intention to restrict the invention to the UMTS system. The invention is suitable for use in any telecommunication system wherein a need exists to carry out a plurality of substantially successive control signallings between a terminal and a telecommunication network. The control signallings can be carried out for different services or different network elements, for example.

The invention can be applied to an access network connected to at least two core networks when it is necessary to carry out separate control signallings between the core networks and the terminal. Different network elements, which can possibly be in the same network, may form operatively different core networks. For example, one network may comprise different network elements supporting mobility management protocols which require separate control signallings. The invention can thus be applied to implementing control signallings to different core networks, the need for control signallings preferably being detected within a time limit set in the terminal.

The invention can also be applied to telecommunication systems with only one core network integrated to be responsible for several different services, such as circuit- and packet-switched connections. Also then, it may be necessary to separately carry out control signallings for circuit- and packet-switched services.

Figure 2:
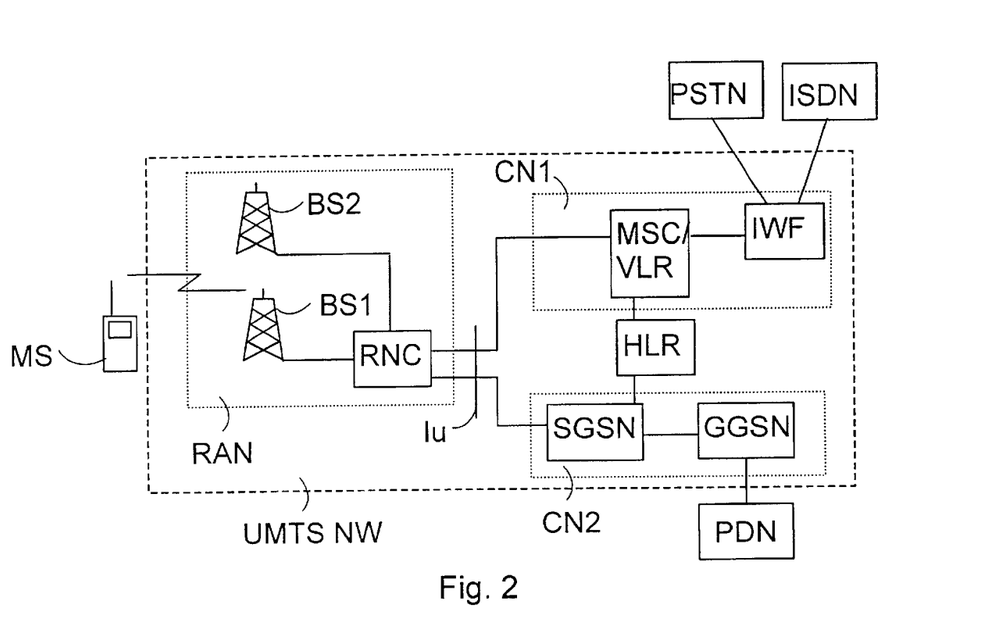
FIG. 2 shows a UMTS mobile communication system in closer detail.

FIG. 2 shows, by way of example, a mobile communication network UMTS NW according to the UMTS system comprising an access network RAN and two core networks CN1 and CN2. A mobile station MS comprises actual mobile equipment ME and a UMTS subscriber identity module USIM, also called a subscriber identification unit, typically detachably connected thereto. The USIM is preferably stored on a smart card UICC (UMTS IC card), which can be changed from a mobile station to another. Thus in this connection, a mobile station generally refers to an entity comprising a subscriber identification unit and actual mobile equipment.

The radio access network RAN, i.e. the UMTS base station system, is responsible mainly for matters associated with the radio path, in other words it provides the core networks and mobile stations with radio access necessary for wireless operation. The RAN comprises one or more base stations BS1, BS2, and a radio network controller RNC controlling the radio frequencies available to the base stations BS1, BS2. The radio network controller RNC communicates with one or more core networks CN1, CN2 over an interface Iu.

The core network is a conventional telecommunication network or a future telecommunication network modified to efficiently utilize the access network in the wireless communication. The core network provides a connection to other systems or networks, such as other UMTS networks, data networks and public telephony networks. FIG. 2 shows core networks CN1, CN2 based on the GSM/GPRS system as examples.

The core network CN1 is responsible for circuit-switched services. The core network CN1 comprises a mobile switching centre MSC, which is responsible for connection setup and routing of the circuit-switched services to correct addresses. Two databases comprising information on mobile subscribers are utilized for the purpose: a home location register HLR and a visitor location register VLR. The mobile switching centre typically also comprises the functions of the visitor location register, exemplified by an MSC\VLR in FIG. 2. The mobile switching centre MSC communicates with other telecommunication networks, such as a public switched telephone network PSTN or an integrated services digital network ISDN, by means of an interworking function IWF.

The core network CN2 is responsible for providing packet-switched services. The CN2 comprises a serving GPRS support node SGSN based on the GPRS system responsible for connection setup and routing of the packet-switched services to correct addresses. The SGSN maintains location information on the mobile station by utilizing, when necessary, the home location register HLR common both to the core networks CN1 and CN2. A GPRS gateway support node GGSN based on the GPRS system enables communication with different packet data networks PDN. The SGSN and the MSC do not typically communicate with each other directly; they may, however, have a Gs interface (not shown) therebetween. As to a more detailed description of the UMTS system, reference is made to the 3GPP UMTS specifications.

In order to transmit information between the mobile station MS and the access network RAN, an RRC (radio resource control) connection is always established therebetween. In order to transmit information between the access network RAN and the core network, a so-called Iu connection is established via an Iu interface. In the UMTS system of FIG. 2, the radio network controller RNC establishes a connection via the Iu interface either to the mobile switching centre MSC or the serving GPRS support node SGSN. After the Iu connection has been established, the radio network controller RNC can transmit a location updating request, for example, to a network element of the core network at issue.

Since one RRC connection may be used for different Iu connections to different core networks, releasing the Iu connection between the core network and the access network does not necessarily mean releasing the radio connection. If the mobile station MS has several simultaneous connections to different core networks, the radio connection can be released only after the last Iu connection has been released. In this respect, the UMTS differs from the GSM, where also the radio connection is released after releasing the Iu connection. However, according to the known UMTS technology, the radio connection cannot be maintained between successive control signallings, which means that the mobile station has only one control signalling connection to a core network at a time.

Figure 3:
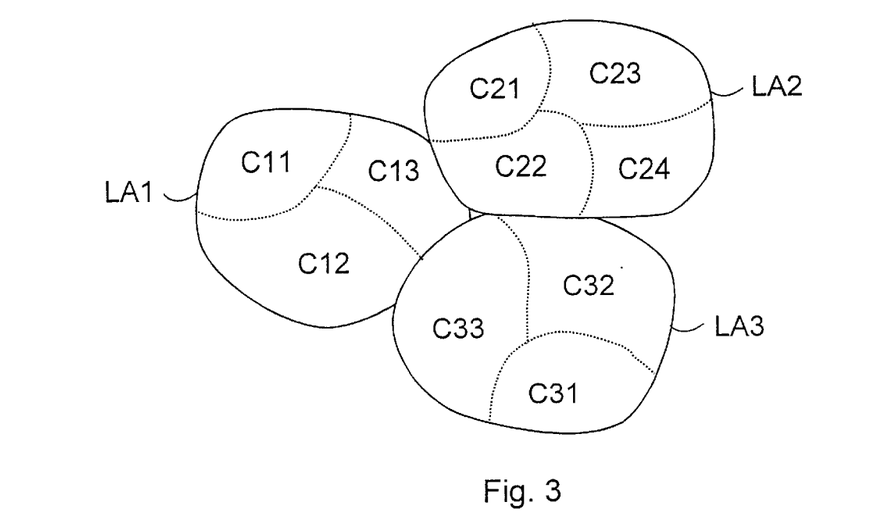
FIG. 3 illustrates a location area structure of a mobile communication system.

FIG. 3 illustrates location areas. A location area ordinarily comprises a coverage area (cell) of several different base stations. A location area LA1 of a core network comprises three cells C11, C12 and C13. Similarly, a location area LA3 comprises cells C31, C32 and C33. A location area LA2 comprises four cells C21, C22, C23 and C24. In fact, a location area is only a set of physical cells defined in a database, and the identifier or name of the set is called a location area identifier. Furthermore, in principle an arbitrary number of different location area levels, such as location areas of different sizes for different core networks, can overlap.

The location area of the packet-switched connections can also be called a routing area. It is feasible that location areas of different sizes are used in the packet-switched GPRS network from those used in the circuit-switched GSM network even if the two networks used a common access network. The operators may, however, start using the same location areas both for the GSM and the GPRS core networks to simplify the network management. Even though the location areas were not the same, situations will occur wherein the location areas of both core networks change when the mobile station moves.

The location areas of different core networks can preferably be implemented such that they overlap, in other words such that one location area may comprise other location areas. Hence, for example, the location area LA2 of a first core network may encompass a location area of another core network comprising cells C21 and C22. In such a case, when the mobile station moves from cell C22 to cell C32, for example, the location areas of both core networks change and the mobile station needs to carry out location update within a short period of time both to the first and the second core network.

Each base station BS broadcasts in its cell the location area identifiers of the location areas of all core networks whereto the cell at issue belongs. The mobile station MS monitors the broadcast location area identifiers of at least those core networks wherein it is active at the moment.

Each time the mobile station MS registered in the mobile communication network changes location areas it sends the access network a location updating request, which causes the location information to be updated in the registers of the core network (or the access network). No location updates to the core network will be carried out, however, if the mobile station has an active connection to the core network at issue for transmitting speech data of the user, for example. When the cell or the location area then changes, "handover" is carried out, in other words the active connection is handed over to be dealt with by another base station. The location update can also be carried out at certain intervals (periodic location update). Furthermore, location update is carried out for registering the mobile station in a network and for bringing it to an "idle state" in the new area (a different location area from the one at the previous registration time).

As was stated above, if the location area boundaries between several different core networks are crossed substantially simultaneously, the mobile station is compelled to transmit several location updating messages over the air interface, one for each core network. An exception to this can be the use of a Gs interface between the network elements MSC and SGSN of different core networks. In such a case, it can be possible to carry out location update for both of them by one location updating message. However, the Gs interface is not compulsory between these centres. In the UMTS system, it may also be necessary to carry out other separate control signallings, such as service requests, within a short period of time to several different core networks substantially successively.

Figure 4:
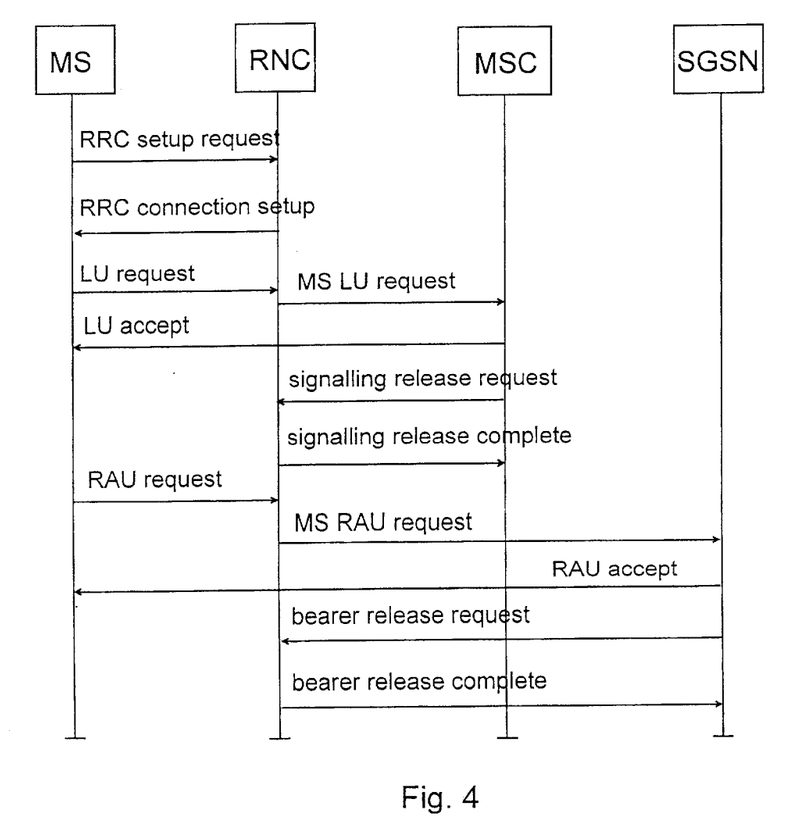
FIG. 4 is a signalling diagram showing, by way of example, control signalling according to a preferred embodiment of the invention.

In the following, the invention will be described by way of example by means of the signalling diagram of FIG. 4 in location update where the mobile station moves from a cell to another such that the location areas of two different core networks change. The mobile station MS can be registered in the core network CN1 (for circuit-switched connections) and the core network CN2 (for packet-switched connections) of FIG. 2 through the access network RAN. The mobile station MS can move, for example, from the base station BS1 to the area of the BS2 in FIG. 2.

The essential point is that a need exists to carry out location update to both core networks CN1 and CN2 within a short period of time regardless of whether or not the location areas of the core networks are the same. The mobile station MS carries out the location updates substantially successively, in other words the mobile station has only one control signalling connection to the core network at issue at a given time. The location area identifiers of the previous location update are stored in the mobile station, preferably in the USIM application. If the location areas are the same to the core networks CN1 and CN2, also the location area identifier can be the same for both networks.

Each base station of the access network RAN broadcasts in its cell the location area identifiers of the location areas of all core networks whereto the cell at issue belongs. The location area information can preferably be transmitted in a broadcast control channel BCCH. The mobile station MS monitors the broadcast location area identifiers of at least those core networks wherein it is registered (CN1 and CN2) at the moment.

The mobile station detects that the location area identifiers of the core networks CN1 and CN2 received from the access network are different from the location area identifiers stored in the mobile station in connection with the previous location update. The mobile station has then moved from one location area to another and has to carry out location update to both core networks CN1 and CN2. Furthermore, the mobile station may detect, on the basis of the information transmitted by the access network, that separate location updates must be carried out to the core networks. The location updates are preferably carried out successively, first to the core network CN1 and then to the core network CN2, for example.

Transmitting the location updating request requires an RRC connection to be established. The radio network controller RNC controls the radio resources, so it is responsible for channel allocation when the mobile station or the core network so requests. According to a preferred embodiment of the invention, the location updates to different core networks are carried out without releasing the radio connection.

According to a preferred embodiment of the invention, the mobile station MS transmits a request to the access network for maintaining the radio connection for later use. The MS preferably transmits the request for maintaining the radio connection also after the signalling to the core network CN1. The location update can then also be carried out to the core network CN2 without releasing the connection.

According to a preferred embodiment of the invention, the mobile station MS comprises the instructions on the basis of which the MS decides to request that the radio connection be maintained. The mobile station preferably comprises a predetermined time limit for detecting the need and making a request for maintaining the radio connection. When the need for control signalling is detected, it can be monitored whether a need arises within the time limit for other control signallings. If within the time limit such a need exists for other control signallings, a request for maintaining the radio connection will be transmitted. If no need has arisen within the time limit for other control signallings, no request will be transmitted to the mobile communication network. The time limit is set so as to avoid too long a delay before starting the control signalling.

In the following, it will be shown by way of example how the mobile station can transmit the request for maintaining the radio connection.

A "follow on proceed" function has been standardized in the GSM system. The function enables the mobile station to transmit, in a location updating request to the GSM mobile switching centre, a request for being allowed to use the radio connection after the location update for other signalling associated with the location management. The location updating request comprises a special "follow on proceed" bit reserved for indicating the request for maintaining the radio connection to the mobile switching centre. The mobile switching centre in turn can, in a location updating acknowledgement (LOCATION UPDATING ACCEPT), indicate to the mobile station that the radio connection can be used for signalling associated with the location management directed to the same mobile switching centre.

The "follow on proceed" function is not, however, suitable to be generally used for implementing several control signallings, least of all if the control signallings are directed to different core networks. According to a preferred embodiment of the invention, the mobile station MS transmits the request to the mobile communication network, preferably to the radio network controller RNC, for maintaining the radio connection for later use, preferably in connection with an RRC setup request (RRC setup request).

The RRC setup request may comprise a (maintain RRC) bit, for example, which indicates that the request for maintaining the radio connection is active. If the traffic situation permits, the radio network controller RNC allocates the radio connection to the mobile station. The RNC detects that the request is active, so it maintains the radio connection after the Iu connection directed to the core network has been released.

The radio network controller RNC and the base station BS activate the radio connection to the mobile station MS. The RNC transmits to the mobile station MS the radio connection setup message comprising the necessary information on the allocated radio connection (RRC connection setup). The message may also comprise an acknowledgement of the maintenance of the radio connection after the Iu connection has been released. In order to set up the radio connection, the transmitter/receiver functions of the mobile station MS are configured according to the received parameters.

The MS transmits the location updating request to the radio network controller RNC by using the radio connection already established to the core network CN1 (LU request). The location updating message typically comprises a subscriber identifier, such as a temporary mobile subscriber identity TMSI identifier, a packet-TMSI (P-TMSI) identifier or an international mobile subscriber identity IMSI identifier, and typically at least the identifier of the old location area LA1. The RNC transmits the location updating request to the mobile switching centre MSC of the core network CN1 (MS LU request). The location updating request can preferably be transmitted in connection with the Iu connection setup message.

When necessary, security functions, such as authentication (not shown), may be carried out between the MSC and the mobile station MS. The MSC updates the necessary registers according to the new location area. At least the visitor location register VLR is typically updated in the location update. When the mobile switching centre/visitor location register changes, the home location register HLR is also updated. Then, the HLR also transmits a request for removing the location information on the mobile station to the old visitor location register. In the example, the location areas are, however, in the same visitor location register VLR, in which case the home location register HLR needs not be updated. The MSC transmits an acknowledgement of the location update to the mobile station MS (LU accept).

After the location update has been carried out, the mobile switching centre MSC transmits a message for releasing the signalling connection (signalling release request) to the radio network controller. Next, the Iu connection between the MSC and the RNC is released. According to the prior art, the RNC would also release the radio connection after the Iu connection has been released. According to a preferred embodiment of the invention, however, the RNC does not release the radio connection.

The radio connection is maintained if the mobile station MS has requested for it, preferably when the radio connection was being set up (RRC setup request). The (maintain RRC) bit then indicates that the radio connection is to be maintained. If no request for maintaining the radio connection has been set forth, the RNC releases the radio connection, as requested by the core network. The information transmitted by the (maintain RRC) bit for maintaining the radio connection is preferably one of the RRC connection parameters in the radio network controller RNC.

According to a preferred embodiment of the invention, the radio network controller sets a time limit for maintaining the radio connection. The radio network controller RNC starts a timer preferably after the Iu connection has been released. If the time limit is exceeded, the radio network controller RNC releases the radio connection even if no control signallings were carried out after starting the timer. It is thus possible to restrict the duration of maintaining the radio connection in case of error situations, for example. If, however, the control signalling is being carried out just when the time limit is exceeded, the radio network controller RNC preferably releases the radio connection only after receiving a connection release request from the core network. The timer can be started also after receiving the RRC setup request.

The RNC may transmit an acknowledgement of the release the Iu connection to the mobile switching centre MSC (signalling release complete). The mobile switching centre can thus be sure that the connection is released when the signalling is over. The radio connection is, however, reserved for the mobile station for signalling even though no active Iu connections were available.

After receiving the location updating acknowledgement (LU accept), the mobile station detects that the location update has been carried out. The mobile station can then carry out the location update to the core network CN2 by using the existing radio connection. In such a case, it has been unnecessary to separately release the radio connection after the first location update, so it is also unnecessary to re-establish the radio connection. Consequently, the amount of signalling to be carried out over the radio interface is reduced.

The mobile station transmits the location updating request to the core network CN2 to the radio network controller (RAU request). Since the core network CN2 is a GPRS network, the request can also be called a routing area update request (RAU). The location update can then be carried out according to the prior art known per se.

The radio network controller RNC detects that the mobile station requests location update to the core network CN2, so the RNC transmits the location updating request to the serving GPRS support node SGSN (MS RAU request). If necessary, security functions, such as authentication (not shown), may be carried out between the SGSN and the mobile station. The SGSN updates the necessary registers according to the new location area. After the location update has been carried out, the SGSN transmits an acknowledgement of the location update to the mobile station (RAU accept).

Furthermore, the SGSN transmits a message for releasing the signalling connection to the radio network controller RNC (bearer release request). The bearer release request over the Iu interface can be similar to the signalling release request transmitted by the MSC. The Iu connection is then released, and the RNC preferably also releases the radio connection since the location update has been carried out to both core networks CN1 and CN2. The (maintain RRC) bit can then have been removed in the RNC during the second location update. Releasing the radio connection is known per se; therefore, it is not shown in FIG. 4. The RNC preferably acknowledges the signalling connection release message transmitted by the SGSN (bearer release complete).

The invention can, however, also be applied in such a manner that the RNC does not release the radio connection until the predetermined time limit is exceeded. The time limit is, however, preferably used only to restrict the reservation of radio connections in case of errors. Also then it is advisable to transmit an acknowledgement to the SGSN so as to prevent the SGSN from interpreting the situation as an error situation.

The location update to two different core networks described above when the mobile station is registered in the UMTS system is only one example of how the invention can be implemented.

According to a preferred embodiment of the invention, the mobile station transmits information on the core networks to which it is to carry out control signallings. In connection with the request for maintaining the radio connection, the mobile station can transmit the information on the core networks to which control signallings are to be carried out later on by using the same radio connection. This can be particularly necessary if the mobile station communicates with more than two core networks. The mobile station can transmit the information on the core networks preferably in the RRC setup request.

The access network, preferably the radio network controller RNC, then maintains the radio connection until the control signallings, such as location updates, to the core networks at issue have been carried out. The RNC can maintain a register of the core networks to which control signallings have been carried out at a given time. After control signallings have been carried out to all core networks specified in the request, the radio connection is released immediately when the last core network releases its Iu connection. The mobile station can, for example, transmit the information on the core networks whose location area it has detected to have changed or in which it is to be registered. Naturally, the duration of the radio connection can be controlled by using a timer, for example, as described above.

Furthermore, the invention can be applied in such a manner that the mobile station transmits information about how many different control signallings are to be carried out during the same radio connection. In such a case, the mobile station can, preferably in connection with the request for maintaining the radio connection, transmit information about how many signalling connections are to be used.

The access network, preferably the radio network controller RNC, then maintains the radio connection until the number of control signallings announced by the mobile station has been carried out. The RNC can detect that each control signalling has taken place when it receives the request for releasing the signalling connection from the core network. The RNC preferably counts how many control signallings have been carried out after the radio connection was activated. When the number of control signallings announced by the mobile station is carried out, the radio connection is released. The number of control signallings required by the mobile station can then be carried out successively, and the radio connection is not maintained unnecessarily. A further advantage is that substantially successive control signallings can also be carried out to the same core network.

The invention can be applied to any telecommunication system wherein several control signallings are carried out substantially successively, in connection with activating the mobile station or location updates carried out at certain intervals, for example.

An example of another kind of signalling to which the invention can be applied is transmitting two service requests to different core networks. The user of the mobile station may then present a need for control signalling. The mobile station MS may, within a predetermined time, for example, detect a need to transmit a short message via the core network CN1 and a need to activate a GPRS connection to the core network CN2.

The mobile station can then transmit the request for maintaining the radio connection to the radio network controller RNC preferably in connection with activating the radio connection. When the mobile station does not have any active traffic connections to the access network, the short message is transmitted by using the signalling connection. The radio network controller then maintains the radio connection even if the short message has already been transmitted to the core network CN1 and the request for releasing the signalling connection possibly already received from the mobile switching centre.

The mobile station can transmit the request for activating the GPRS connection by using the existing radio connection. When the signalling connection to the core network CN2 is no longer needed, the radio network controller releases the radio connection. Hence, the signalling to be carried out over the radio path can be reduced when the radio connection is not released between the service requests.

According to a preferred embodiment of the invention, the mobile station can also transmit the information about maintaining the radio connection to the core network, which, in turn, transmits the information to the access network in order to maintain the radio connection. In the following, this embodiment will be described in a simplified manner by means of FIG. 5.

Figure 5:
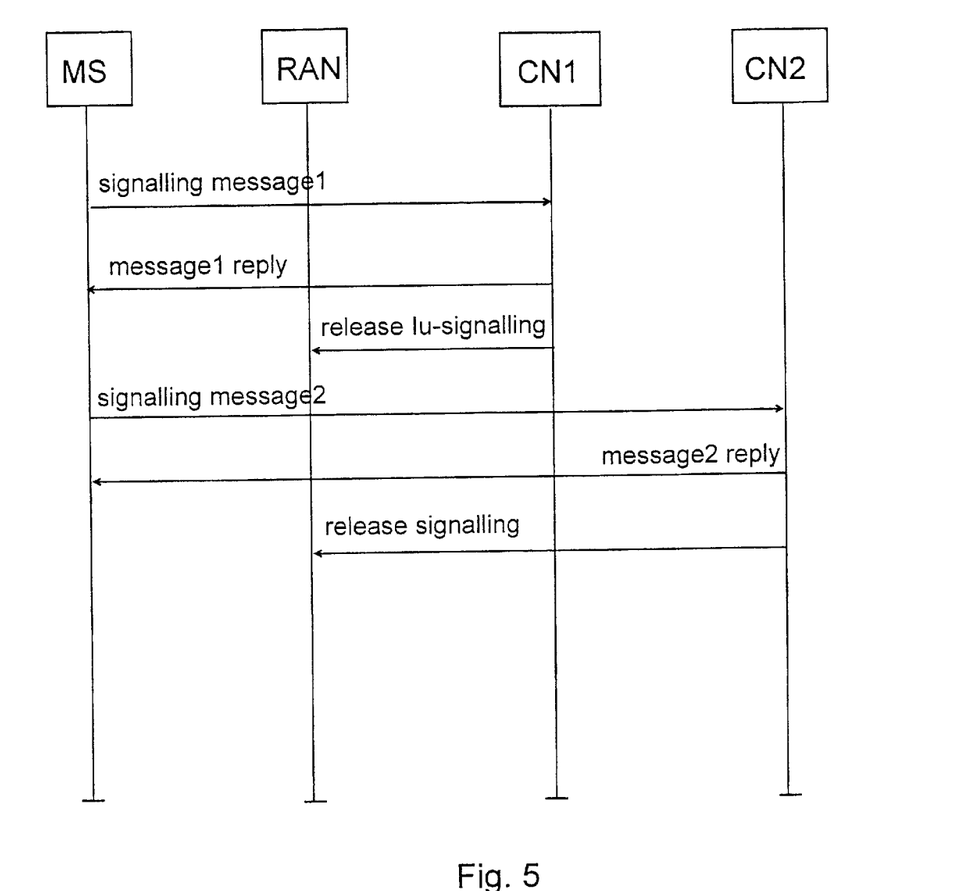
FIG. 5 is a signalling diagram showing, by way of example, control signalling of a preferred embodiment of the invention.

The mobile station MS detects, within a predetermined time limit, for example, that a need exists to carry out control signallings to the core networks CN1 and CN2. When the radio connection to the access network RAN has been established, the MS transmits the control signalling message to the core network CN1 (signalling message1). According to a preferred embodiment of the invention, the message comprises the information that the radio connection should be maintained after the signalling for later use. Furthermore, as described above, the message can comprise information on the core networks or the number of control signallings.

The core network CN1 carries out the procedures required by the control signalling and transmits an acknowledgement to the mobile station MS (message1 reply). Since the Iu connection is no longer needed between the access network and the core network CN1, the CN1 transmits a request for releasing it (release Iu-signalling). Preferably in the same message, the core network CN1 informs the access network RAN that the radio connection is not released even if the Iu connection is released. The message may also comprise more accurate information about maintaining the radio connection, for example that the mobile station desires to carry out control signalling to the core network CN2, and, after the signalling, the radio connection can be released. The access network RAN then maintains the radio connection according to the instructions received from the core network CN1.

The MS carries out a second control signalling to the second core network CN2 by using the existing radio connection (signalling message2). The CN2 transmits an acknowledgement to the mobile station MS (message2 reply). Next, the CN2 transmits a request for releasing the signalling connection (release signalling), which can be similar to the request transmitted by the core network CN1 (release Iu-signalling). On the basis of this, the Iu connection is released and the access network further releases the radio connection on the basis of the instructions received from the core network CN1.

When applied to the mobile communication system, the invention can be implemented with relatively small changes in the mobile station and the access network. When a solution according to a preferred embodiment of the invention is applied wherein information is transmitted to the core network about maintaining the radio connection, changes in comparison with the prior art are also required in the implementation of the core network. In order to minimize the changes required in the mobile communication network, it is to be recommended that the invention should be implemented such that the request for maintaining the radio connection is transmitted to the access network. The changes can be implemented by software, for example.

It is obvious to one skilled in the art that as technology advances, the basic idea of the invention can be implemented in many different ways. The invention and its embodiments are thus not restricted to the examples described above but they can vary within the scope of the claims.

What is claimed is:

1. A method of implementing control signallings in a telecommunication system including at least one terminal and one telecommunication network, the telecommunication network including at least one access network and one or more core networks, wherein the access network is connected to the core networks so that control signallings may be carried out between each core network and each terminal via the access network, the method comprising:

detecting a need for a plurality of control signallings in the telecommunication system;

carrying out the plurality of control signallings between the terminal and at least one core network substantially successively without releasing a connection established for control signalling between the terminal and the access network during a time period between the plurality of control signallings in response to the detecting.

2. The method of claim 1, wherein a time limit for detecting the need for the plurality of control signallings is determined in the terminal, and the connection is maintained during the time period between the control signallings in response to detection of the need for the plurality of control signallings within the time limit.

3. The method of claim 1, wherein the telecommunication system is a mobile communication system, the terminal is a mobile station, and the connection is a radio connection.

4. The method of claim 1, further comprising:

the terminal determining the core networks to which a need for control signalling is detected, the terminal transmitting a request for maintaining the connection established for control signalling between the terminal and the access network to the telecommunication network, carrying out control signalling between the terminal and a determined first core network, carrying out control signallings between the terminal and other determined core networks, and releasing the connection established for control signalling between the terminal and the access network after the control signallings have been carried out to all determined core networks.

5. The method of claim 4, the method further comprising:

determining, in the access network, in parameters of the connections, that the connection should be maintained in response to said request transmitted by the terminal.

6. The method of claim 4, wherein information about the number of necessary control signallings is transmitted in the request for maintaining the connection, the access network counts the number of control signallings carried out by the terminal, and the connection established for control signalling between the terminal and the access network is maintained until the number of control signallings announced by the terminal has been carried out.

7. The method of claim 4, wherein information about the core networks to which control signallings need to be carried out is transmitted in the request for maintaining the connection,
the access network monitors to which core networks the control signallings are carried out, and
the connection established for control signalling between the terminal and the access network is maintained until the control signallings to all core networks identified in the request have been carried out.

8. The method of claim 4, wherein the request for maintaining the connection is transmitted from the terminal to the access network.

9. The method of claim 8, wherein the request for maintaining the connection is transmitted from the terminal to the access network in a setup request message of the connection.

10. The method of claim 4, wherein the request for maintaining the connection is transmitted from the terminal to the core network to which control signalling is carried out first,
a request for maintaining the connection is transmitted from the core network to the access network after the control signalling, and
the control signallings are carried out between the terminal and other determined core networks without releasing the connection established for control signalling between the terminal and the access network.

11. The method of claim 1, wherein a time limit is set for maintaining said connection, and
the connection established for control signalling between the terminal and the access network is released when the time limit for maintaining the connection has been exceeded even if all control signallings have not been carried out.

12. The method of claim 1, wherein
the control signallings to be carried out are location updates, and
the terminal determines the core networks that need location updating based on location information broadcast by the access network.

13. A telecommunication system comprising:
at least one terminal; and
one telecommunication network, the telecommunication network including at least one access network and one or more core networks, the access network being connected to the core networks,
wherein the at least one terminal is configured to detect a need for a plurality of control signallings in the telecommunication system;
wherein the plurality of control signallings may be carried out between each core network and each terminal, and
the access network is configured to maintain a connection established for control signalling between the terminal and the access network during a time period between substantially successive control signallings of the plurality of control signallings between the terminal and at least one core network when the terminal detects a need for the plurality of control signallings.

14. The telecommunication system of claim 13, wherein the terminal comprises means for determining a time limit for detecting the need for the plurality of control signallings, and
the telecommunication network is configured to maintain the connection established for control signalling between the control signallings in response to detecting the need for the plurality of control signallings within the time limit.

15. The telecommunication system of claim 13, wherein the telecommunication system is a mobile communication system, the terminal is a mobile station, and the connection is a radio connection.

16. The telecommunication system of claim 13, wherein the terminal is configured to determine the core networks to which a need for control signalling is detected,
the terminal is configured to transmit a request for maintaining the connection established for control signalling between the terminal and the access network to the telecommunication network,
the terminal and a determined first core network are configured to carry out control signalling,
the terminal and other determined core networks are configured to carry out other necessary control signallings, and
the access network is configured to release the connection established for control signalling between the terminal and the access network after the control signallings have been carried out to the determined core networks.

17. The telecommunication system of claim 16, wherein the access network is configured to determine, in parameters of the connection, that the connection should be maintained in response to the request transmitted by the terminal.

18. The telecommunication system of claim 16, wherein the terminal is configured to transmit information about the number of necessary control signallings in the request for maintaining the connection,
the access network is configured to count the number of control signallings carried out by the terminal, and
the access network is configured to maintain the connection established for control signalling between the terminal and the access network until the number of control signallings announced by the terminal has been carried out.

19. The telecommunication system of claim 16, wherein the terminal is configured to transmit information about the core networks to which control signallings need to be carried out,
the access network is configured to monitor to which core networks the control signallings are carried out, and
the access network is configured to maintain the connection established for control signalling between the terminal and the access network until the control signallings to all core networks mentioned in the request have been carried out.

20. The telecommunication system of claim 16, wherein the terminal is configured to transmit the request for maintaining the connection to the access network.

21. The telecommunication system of claim 20, wherein the terminal is configured to transmit the request for maintaining the connection in a setup request message of the connection.

22. The telecommunication system of claim 16, wherein the terminal is configured to transmit the request for maintaining the connection to the core network to which control signalling is carried out first,
the core network is configured to transmit a request for maintaining the connection to the access network after the control signalling, and
the access network is configured to maintain the connection established for control signalling between the terminal and the access network between the control signallings to other core networks.

23. The telecommunication system of claim 13, wherein the access network is configured to set a time limit for maintaining the connection established for control signalling between the terminal and the access network, and the access network is configured to release the connection when the time limit for maintaining the connection has been exceeded even if all control signallings have not been carried out.

24. The telecommunication system of claim 13, wherein the control signallings to be carried out are location updates, and the terminal is configured to determine the core networks that need location updating based on location information broadcast by the access network.

25. A network element of a telecommunication system, wherein the network element is configured to provide a connection for a terminal, the terminal is configured to detect a need for a plurality of control signallings in the telecommunication system;

the network element is configured to maintain the connection established for control signalling between the terminal and the network element during a time period between different, substantially successive control signallings of the plurality of control signallings in response to a request from the terminal when the terminal detects a need for the plurality of control signallings.

26. The network element of claim 25, wherein the network element is a radio network controller of an access network in the mobile communication system.

27. A terminal comprising means for carrying out control signallings in a telecommunication system via an access network to one or more core networks, wherein the terminal is configured to detect a need for a plurality of control signallings in the telecommunication system, and the terminal is configured to transmit a request for maintaining the connection established for control signalling between the terminal and the access network to a telecommunication network when the terminal detects a need for the plurality of control signallings.

* * * * *